United States Patent
Dutta

(12) 
(10) Patent No.: US 6,606,604 B1
(45) Date of Patent: Aug. 12, 2003

(54) INCREMENTAL UPDATES OF ITEMS AND PRICES ON A CUSTOMER'S COMPUTER TO REDUCE DOWNLOAD TIMES FOR FREQUENTLY PURCHASED ITEMS IN E-COMMERCE TRANSACTIONS IN A METHOD, SYSTEM AND PROGRAM

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 09/583,343

(22) Filed: May 31, 2000

(51) Int. Cl.[7] .............................................. G06F 17/60
(52) U.S. Cl. ....................................................... 705/26
(58) Field of Search ...................................... 705/26, 27

(56) References Cited

U.S. PATENT DOCUMENTS

| | | | |
|---|---|---|---|
| 5,319,542 A | * 6/1994 | King, Jr. et al. | 705/27 |
| 5,528,490 A | * 6/1996 | Hill | 705/26 |
| 5,664,110 A | * 9/1997 | Green et al. | 705/26 |
| 5,737,619 A | 4/1998 | Judson | 395/761 |
| 5,794,217 A | * 8/1998 | Allen | 705/27 |
| 5,860,071 A | 1/1999 | Ball et al. | 707/100 |
| 5,907,681 A | 5/1999 | Bates et al. | 395/200.58 |
| 5,918,014 A | 6/1999 | Robinson | 395/200.49 |
| 5,931,904 A | 8/1999 | Banga et al. | 709/217 |
| 5,951,641 A | 9/1999 | Menard et al. | 709/217 |
| 5,951,652 A | 9/1999 | Ingrassia, Jr. et al. | 709/248 |
| 5,956,709 A | 9/1999 | Xue | 707/3 |
| 6,032,130 A | * 2/2000 | Alloul et al. | 705/27 |
| 6,055,516 A | * 4/2000 | Johnson et al. | 705/27 |

FOREIGN PATENT DOCUMENTS

| | | | |
|---|---|---|---|
| JP | 10187753 | 7/1998 | G06F/17/30 |
| JP | 2002-163506 A | * 6/2002 | G06F/17/60 |

OTHER PUBLICATIONS

Neelakantan, Shailaja, "Freemail", Aug. 12, 1996, Forbes, vol. 158, No. 4, p. 140.*
"Sears Roebuck Announces New Discount Program", May 19, 1983, PR Newswire.*
Adam Dingle, Tomas Partl, *Web cache coherence*, Computer Networks and ISDN Systems, pp. 907–920.
IBM Technical Disclosure Bulletin, *Information Retrieval and Presentation Apparatus with Version Control*, vol. 41, No. 01, Jan. 1998, pp. 711–712.
On–Line IP Portfolio Management, 62/Research Disclosure, Jan. 1999, Disclosed anonymously.
Greg Rice, *Tying It All Together*, EC World, Jun. 1999, pp. 38–41.

* cited by examiner

*Primary Examiner*—Richard Chilcot
*Assistant Examiner*—Bryan Jaketic
(74) *Attorney, Agent, or Firm*—Marilyn Smith Dawkins; Bracewell & Patterson, L.L.P.

(57) ABSTRACT

Ordering information required for recurring purchase of frequently purchased items, such as an HTML order form and item and pricing information, is cached within a customer's data processing system separately from the browser cache. The item and pricing information includes an associated validity period and is incrementally updated as necessary. Orders may thus be assembled on the customer's data processing system with little or no communication with the retailer's server, then transmitted to the retailer's server for processing when complete, reducing network traffic and server loading for the recurring transactions.

31 Claims, 3 Drawing Sheets

INCREMENTAL UPDATES OF ITEMS AND PRICES ON A CUSTOMER'S COMPUTER TO REDUCE DOWNLOAD TIMES FOR FREQUENTLY PURCHASED ITEMS IN E-COMMERCE TRANSACTIONS IN A METHOD, SYSTEM AND PROGRAM

BACKGROUND OF THE INVENTION

1. Technical Field

The present invention generally relates to Internet data transfers concerning electronic commerce and in particular to data transfers concerning recurring sales transactions between specific parties. Still more particularly, the present invention relates to incremental updates of Internet data transmitted between parties which conduct electronic sales transactions on a recurring basis.

2. Description of the Related Art

The global network of computers commonly known as the Internet or World Wide Web has seen explosive growth in the last several years, fueled largely by increasing focus of businesses on "e-commerce," the performance of commercial transactions utilizing the Internet. The number of retailers who offer goods or services for sale utilizing the Internet (often referred to as "e-tailers") is increasing rapidly. Moreover, e-commerce is expanding from predominantly business-to-consumer ("B2C") transactions into the area of business-to-business ("B2B") transactions.

A serious impediment for e-commerce retailers is the length of time required for information delivery over the Web. According to some surveys, home users must wait an average of thirty seconds to load Web pages from the most popular e-commerce sites. Business users, which typically have access to faster T1 connections, have been found to wait an average of eight seconds to load each page. Such delays are problematic for e-commerce retailers since shoppers generally do not like to wait for Web pages to download, and are reluctant to visit a site that requires long download times.

Long download times result not only from small bandwidth connections (e.g., 56 K dial-ups rather than T1 or DSL connections) and the large data sizes of graphics-intensive Web pages, but also from network congestion or server overload. Each request for a Web page from a customer's system to a server and the associated response by the server consumes a portion of the finite bandwidth available for transferring data. Additionally, each request for a Web page which requires the full content of the Web page to be returned consumes a portion of the serving capacity of the Web site. Reduction of the amount of data required for at least some request/response transactions could ease traffic congestion and server loading problems.

SUMMARY OF THE INVENTION

It is therefore one object of the present invention to improve Internet data transfers concerning electronic commerce.

It is another object of the present invention to improve data transfers concerning recurring sales transactions between specific parties.

It is yet another object of the present invention to provide incremental updates of Internet data transmitted between parties which conduct electronic sales transactions on a recurring basis.

The foregoing objects are achieved as is now described. Ordering information required for recurring purchase of frequently purchased items, such as an HTML order form and item and pricing information, is cached within a customer's data processing system separately from the browser cache. The item and pricing information includes an associated validity period and is incrementally (i.e., with finer granularity than the page) updated as necessary. Orders may thus be assembled on the customer's data processing system with little or no communication with the retailer's server, then transmitted to the retailer's server for processing when complete, reducing network traffic and server loading for the recurring transactions.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
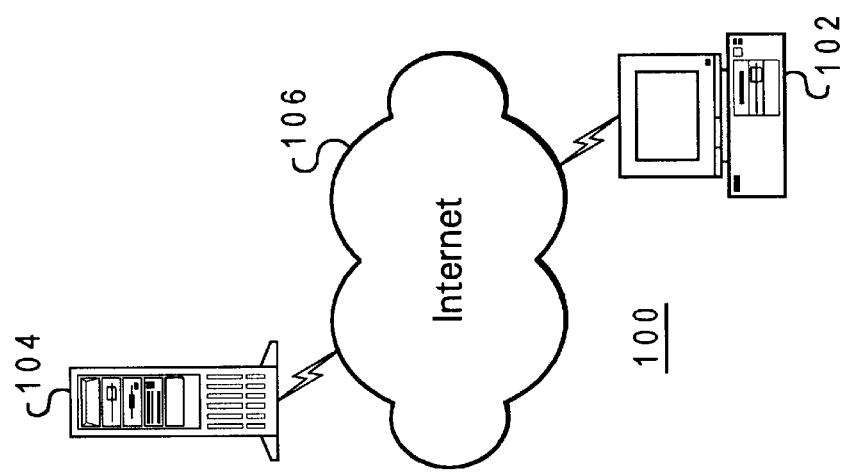
FIG. 1 depicts a network in which a preferred embodiment of the present invention may be implemented.

With reference now to the figures, and in particular with reference to FIG. 1, a network in which a preferred embodiment of the present invention may be implemented is depicted. The exemplary embodiment of system 100 includes a customer's data processing system 102 and e-commerce server 104. E-commerce server 104 contains HyperText Markup Language (HTML) Web pages offering products or services for sale and/or HTML Web pages utilized in completing sales transactions, which may include HTML forms. Data transactions between data processing system 102 and e-commerce server 104 occur over the Internet 106 and conform to the HyperText Transfer Protocol (HTTP) in accordance with the known art.

In the present invention, data processing system 102 is employed by a customer to purchase items from a retailer operating e-commerce server 104. The purchase transaction typically involves an order and payment utilizing data processing system 102 and e-commerce server 104, followed by delivery of the purchased goods by common carrier (e.g., through the U.S. Postal Service) or individual delivery. Purchases by the customer from the retailer recur either periodically or intermittently over a period of time, and typically involve items within an arbitrary but identifiable group. For example, purchases of office supplies from an online office supply retailer will frequently follow this pattern. Purchases of groceries and other household items are also likely to include recurring purchase of the same items. Online purchases of books and music within particular categories by a specific customer are also to recur. The present invention may be employed to reduce network traffic and server loading for such transactions.

Figure 2:
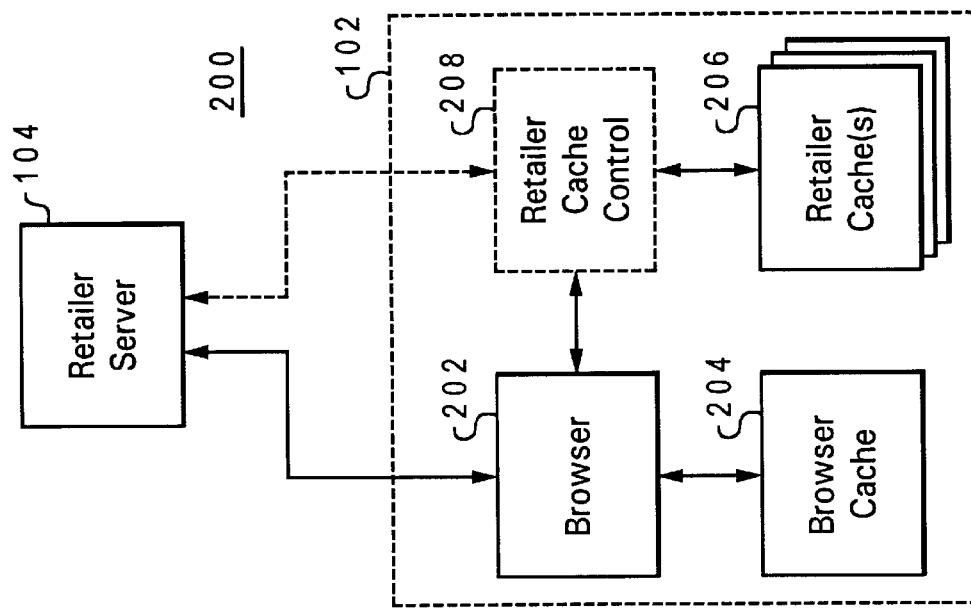
FIG. 2 is a block diagram of a system for incremental updates of items and prices in accordance with a preferred embodiment of the present invention.

Referring to FIG. 2, a block diagram of a system for incremental updates of items and prices in accordance with a preferred embodiment of the present invention is depicted. System 200 includes a browser application 202 executing within customer's data processing system 102 and retrieving and displaying HTML Web pages in accordance with the known art. Browser 202 typically maintains a cache 204 within local nonvolatile storage. Most contemporary Web browsers are currently equipped with caching capabilities, in which Web pages which have been retrieved are cached locally for use when a subsequent request for the same Web page is made. The retrieval date for pages within a cache may be employed together with a period after which the page becomes "stale," and is no longer used. Alternatively, the browser may compare the cached page with the current content at the originating server, and utilize the cached page only if there is no difference. In either case, however, the browser generally controls both (1) whether pages are utilized from the cache or retrieved from the originating server, and (2) whether pages are deleted from the cache.

The browser cache 204 does not provide a satisfactory solution to minimizing network traffic and server loading in connection with recurring sales transactions. Other than forcing a browser which compares cached pages to current content to retrieve the entire page, the originating server can not control whether cached or retrieved pages are utilized. Additionally, the browser will retrieve the entire page, if changed, rather than merely retrieving changes to the page. Moreover, the originating server cannot effectively control whether the browser deletes pages from the browser cache.

In the present invention, Web pages which are employed in recurring sales transactions between parties (i.e., between the customer and the e-commerce vendor) are stored in a local cache 206 separate from the browser cache 204. A similar caching mechanism may be employed for both browser cache 204 and retailer's local cache 206, but the caches are preferably maintained and controlled separately. Retailer's cache 206 may be, for example, located within an area of the client file system (often referred to as a "sandbox") on customer's data processing system 102 which is reserved for data from trusted Java applets. Retailer's cache 206 contains the data required to support recurring sales transactions between the retailer and the customer without downloading Web pages from the retailer's server 104 for each transactions. In the present invention, persistent or "constant" information such as order forms are segregated from information which periodically or intermittently changes state on a regular or frequent basis.

Figure 3:
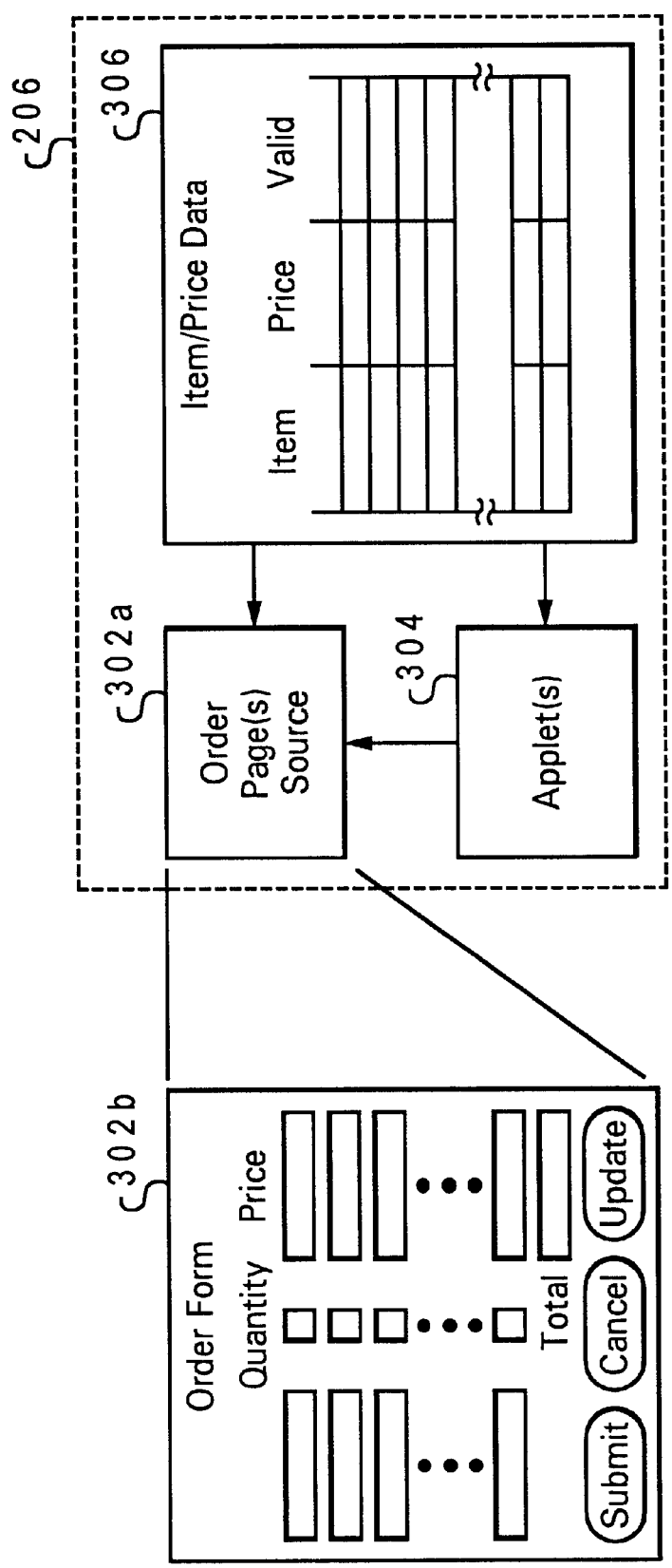
FIG. 3 depicts a diagram of data structures maintained within a retailer's local cache in accordance with a preferred embodiment of the present invention.

With reference now to FIG. 3, a diagram of data structures maintained within a retailer's local cache in accordance with a preferred embodiment of the present invention is depicted. Cache 206 within the customer's data processing system contains the HTML source 302a of Web pages employed to place an electronic order with the retailer through the retailer's e-commerce server. HTML source 302a, when viewed with a browser, includes an order form 302b for ordering goods or services from the retailer. Any applets 304 (or executable scripts, etc.) required to utilize HTML source 302a are also contained within cache 206. Together, HTML source 302a and applets 304 form the persistent content of the retailer's Web pages for ordering goods or services, which are only modified rarely. The volatile portion of the retailer's ordering Web page content, which consists primarily of pricing information normally requiring frequent updates (e.g., daily or weekly), is stored within a separate data file 306 within cache 206.

The pricing information 306 within retailer's cache 206 includes item identifications and/or descriptions, prices for each of the items, and a "valid through" or "update after" date associated with the prices, indicating the date after which the pricing information is no longer valid. Pricing information 306 is incrementally updated—that is, prices which are no longer valid are updated from the retailer's server. This may be accomplished by replacement of the entire pricing information data file 306, or on an item-by-item basis for specific portions of the pricing information data file 306.

The items for which pricing information is maintained within retailer's cache 206 may include all items offered for sale by the retailer, but preferably includes only those items which the customer is most likely to purchase on a recurring basis. Additionally, although depicted in the exemplary embodiment as a separate data file, the pricing information 306 may be integral with the order form source 302a and/or applets 304, although this complicates incremental updating of the type described herein.

Referring back to FIG. 2, in operation the incremental update system 200 employs the locally cached Web page source within cache 206 to display the requisite order form within the user interface of browser 202 when the customer initiates placement of an order. The locally stored HTML source for the order form may be directly bookmarked or linked to an icon on a personal toolbar within browser 202. Alternatively, when the user submits an HTTP request for the order form from the retailer's server, the server may respond with a redirect to the locally cached content.

The customer employs the locally cached HTML source, applets, and pricing information within retailer's cache 206 to generate an order—that is, the order form with desired purchases entered. Once the order has been generated, the data from the order form is transmitted to the retailer's server for processing, which may extract the particulars of the purchase from the transmitted data and return a confirmation of the order. Until the customer has completed the order, however, no data need be transferred between the retailer's server 104 and the customer's data processing system 102. Accordingly, network traffic and loading of server 104 is reduced for the purchase transaction, which may result in significant reductions of network traffic and server loading across a number of purchases transactions.

As a specific example, consider a customer electronically shopping for office items on a weekly basis. The customer registers with the e-commerce server 104 of the retailer, an optional step employed with the example being described. The e-commerce retailer may have thousands or tens of thousands of products available for purchase, so the customer may specify items of interest for recurring purchase as part of the registration process. Alternatively, a list of such items may be extracted from the items which the customer views or requests while browsing at the retailer's Web site during one visit or across several visits.

The customer exhibits interest in specific items, such as spiral ring notebooks, blue and black ink pens, and printing supplies for a particular make and model of laser printer. Presumably the customer purchases these items on a frequent basis for their office, and is basically familiar with these items. The e-commerce retailer then performs a one-time download of items and pricing to the customer's data processing system 102, which may be either a complete listing of items available or a partial listing of only those items in which the customer exhibited interest. For example, the e-commerce retailer's server may download the following information:

| Item/Description | Price | Update after |
| --- | --- | --- |
| 3435 Avery Spiral Ring Notebook | $1.15 | 09-07-99 |
| 3436 Brother Spiral Ring Notebook | $2.00 | 10-07-99 |
| 4536 Wilson black ink pen | $1.14 | 10-07-99 |
| 4545 Parker black ink pen | $7.15 | 12-07-99 |
| 4546 Canon 4100 C cartridge (2 pk) | $9.00 | 01-08-00 |
| 4564 Cannon 4100 BW cartridge (2 pk) | $6.00 | 01-15-00 |

This pricing information is stored locally on the customer's data processing system and updated as necessary, given the validity periods for each price.

Pricing information stored on the customer's data processing system which has become stale may be updated by one of several different mechanisms. The customer may elect automatic updates for particular items having pricing information stored locally via a pull (initiated by the customer's data processing system) or a push (initiated by the retailer's server, assuming that the customer's data processing system is turned on and connected). Either the entire block of pricing information may be replaced with updated content, or individual prices may be updated.

Stale prices need not be updated unless the customer indicates an interest in purchasing the corresponding item. Even then, the stale pricing information may be utilized with some visual indicator to the customer (e.g., a red "X" through the price) that the information is no longer valid. Just before submitting the order, the customer may then request an update of all stale prices for items being ordered in a single request-response transaction. Alternatively, the stale ordering information may be utilized without visual indication to the user, and updates automatically transmitted by retailer's server is response to receiving an order containing stale information. The order may then be automatically revised to reflect the updates and presented to the customer for review, modification if desired, and resubmission. In either of these manners, network traffic and server loading relating to pricing updates are minimized.

Pricing updates may alternatively be performed at periodic intervals. In one embodiment, e-commerce server 104 is enabled (given permission) by the customer only to transmit any necessary changes when requested by customer's data processing system 102. In an alternative embodiment, however, e-commerce server 104 is enabled to access customer's data processing system 102 and determine the validity of prices currently stored within cache 206. If the pricing or item numbers of any stored information is out of date, the changes are automatically transmitted to customer's data processing system 102 by e-commerce server 104, assuming customer's data processing system 102 is online. Server 104 may notify the customer of the pending updates through an e-mail or the like or, depending on the arrangement made between the customer and e-commerce retailer, may access customer's data processing system 102 for updates without any notification to the customer. Updates may include new items (identified through revision dates or numbers) as well as pricing.

Returning to the example, the customer may shop online on Sep. 6, 1999, upload an order to the retailer's server 104 and receive the pricing information listed above, On Sep. 8, 1999, after expiration of the validity for the price of item 3435, the customer's data processing system 102 updates the pricing for that item, receiving the following information:

| Item/Description | Price | Update after |
| --- | --- | --- |
| 3435 Avery Spiral Ring Notebook | $1.19 | 10-07-99 |

In this embodiment, updates are assumed to be retrieved by the customer's data processing system 102 whenever a price is determined to be stale. For this purpose, an optional retailer cache control mechanism 208 may be provided and executed whenever the customer's data processing system 102 is powered and connected (e.g., whenever the browser application 202 is launched) to update prices having an expired validity period. In the example being described, therefore, when the customer subsequently shops online on Sep. 9, 1999, the order can be generated entirely from locally stored data and simply uploaded to the retailer's server 104.

During updates of volatile ordering information within the local cache, information regarding other products may be transmitted by the retailer, such as information regarding new products available for purchase or information regarding sales or other promotional offerings.

Figure 4A:
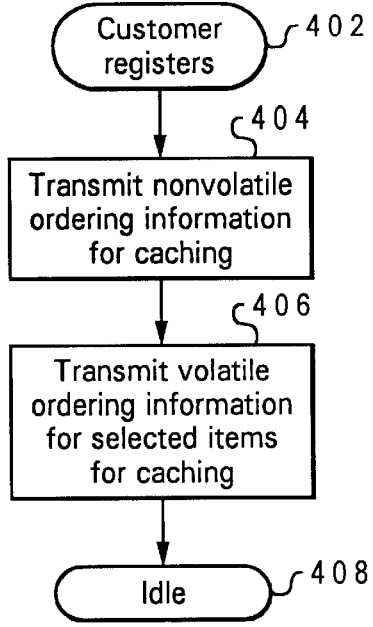
FIGS. 4A–4D are high level flow charts for processes involved in incrementally updating information for recurring e-commerce transactions in accordance with a preferred embodiment of the present invention.

Referring to FIGS. 4A through 4D, high level flow charts for processes involved in incrementally updating information for recurring e-commerce transactions in accordance with a preferred embodiment of the present invention are illustrated. The process of FIG. 4A is executed within a retailer's server and begins with step 402, which depicts a customer connecting to an e-commerce web site server and registering for recurring purchases providing name, credit card number, shipping address(es), etc., to the server and selecting a username and password for subsequent logons. The server may display lists of items or categories of items available for purchase from which the user may make select those which interest the customer, searching and adding items to a separate list.

Once the items or categories of items which the customer is interested in purchasing on a recurring basis have been identified, the process then passes to step 404, which illustrates the server transmitting the nonvolatile or constant ordering information (e.g., the HTML order forms and applets) for caching on the customer's data processing system separately from the browser cache. This nonvolatile ordering information is not expected to change frequently, although it may be updated periodically utilizing known update techniques. The process then passes to step 406, which depicts the server transmitting the volatile or variable ordering information (e.g., prices and items available) for caching in the customer's data processing system together with the nonvolatile ordering information. This volatile ordering information will be the subject of incremental updates as described herein. The process then passes to step 408, which illustrates the process becoming idle until another customer registers.

Figure 4B:
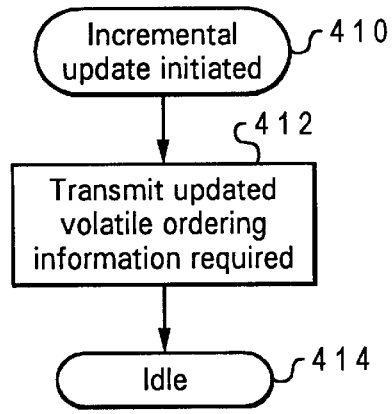

The process of FIG. 4B, which relates to transmission of incremental updates, is also executed within the retailer's server and begins with step 410, which depicts an incremental update request being initiated. Updates to the frequently purchased item list stored on the customer's data processing system may be pushed by the retailer's server or pulled by the customer's data processing system. Accordingly, the update may be initiated by an HTTP request from the customer's data processing system or by a direct transmission from the retailer's server. The process passes next to step 412, which illustrates transmission of the updated volatile ordering information required at the customer's data processing system by the retailer's server. The process then passes to step 414, which depicts the process becoming idle until another incremental update is initiated.

Figure 4C:
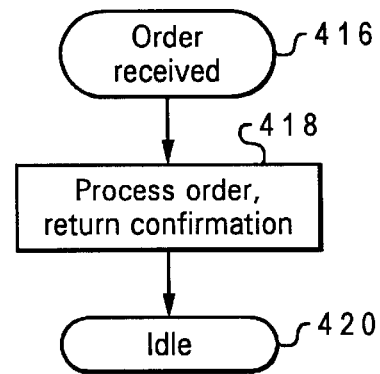

The process of FIG. 4C, which relates to processing orders utilizing incrementally updated information, is executed within the retailer's server and begins with step 416, which depicts an assembled order being received at the retailer's server. In conventional e-commerce sales transactions, the retailer's server is involved in the generation of a purchase order. In the present invention, however, the purchase order may be generated within the customer's data processing system with little or no communication with the retailer's server other than transmission of the completed order. The process passes first to step 418, which illustrates the retailer's server processing the received order and returning a confirmation. Since the retailer's server may not have been involved in generation of the order, a comparison of the items and prices within the order to the current information within retailer's server may be required. However, such a comparison may be necessary even in conventional e-commerce transactions. The process then passes to step 420, which depicts the process becoming idle until another order is received.

Figure 4D:
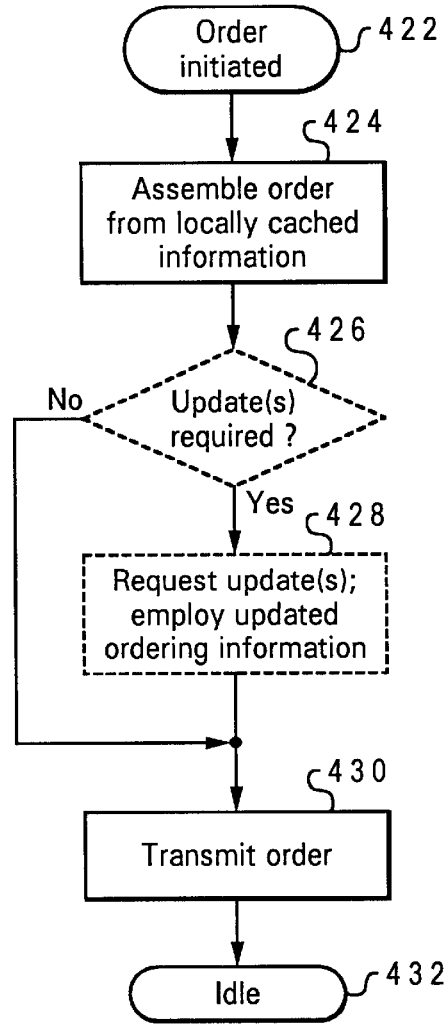

The process of FIG. 4D is executed within the customer's data processing system and begins with step 422, which illustrates a customer registered with a particular e-commerce Web site for recurring purchases and having locally cached ordering information for that Web site initiating an order. The customer has previously received and cached any required forms and ordering information regarding items for which the customer indicated, during registration, an interest in purchasing on a recurring basis. Additionally, the original ordering information received in connection with registration may have been updated. The process passes to step 424, which depicts the customer assembling an order for the desired items utilizing cached ordering information.

The process may then pass to optional step 426, which illustrates a determination of whether any ordering information requires an update. For example, items having an expired validity period or new items not included on any previously entered order(s) and not found within the ordering information stored at the client may necessitate an update of the volatile ordering information. If an update is required, the process may then proceed to optional step 428, which depicts the customer's data processing system requesting any required updates from the retailer's server and employing the updated ordering information to revise the assembled order. This may be performed after assembly of the order is essentially complete, with stale information within the order visually indicated to the customer to prompt manual initiation of an update by the customer or, alternatively, with an update being automatically performed by the retailer's server in response to receiving an order containing stale ordering information.

With or without optional steps 426 and 428, the process next passes to step 430, which illustrates the customer's data processing system connecting to the retailer's server and transmitting the completed order to the retailer's server. The process then passes to step 432, which depicts the process becoming idle until another order of frequently purchased items is initiated by the customer.

In conventional e-commerce purchases, orders involve a series of data transactions in order to generate the required order. With the present invention, this series of data transactions may be reduced, for items purchased on a recurring basis, to a single request/response transaction for incrementally updating variable ordering information, and submission of the order to the retailer's server (with any required confirmation response). Network traffic and server loading for the purchase may thus be significantly reduced, and substantial reductions in traffic and loading may be achieved across the high volumes of orders received by some e-commerce vendors.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of efficiently effecting recurring e-commerce sales transactions between a customer system and a remote ordering server, said method comprising:

generating at a disconnected customer system an electronic order for a desired e-commerce transaction, wherein said order conforms with ordering requirements of said remote ordering server, and said order comprises locally stored ordering information including a particular set of recurring items that are desired to be ordered on a recurring basis from a larger group of items offered for electronic purchase from the remote ordering server and further including variable ordering information and an associated validity period for respective ones of the recurring items, wherein the corresponding variable ordering information is dynamically updatable responsive to whether said validity period indicates that an associated variable ordering information should be updated when said customer system is connected to said remote ordering server;

connecting to the remote ordering server to submit the order; and dynamically receiving updates of the variable ordering information within the order if the variable ordering information within the order is no longer valid at the time of connection to the remote ordering server based on said validity period.

2. The method of claim 1, further comprising:

obtaining the locally stored ordering information from the remote ordering server during a prior connection to said remote ordering server via the Internet; and caching the locally stored ordering information obtained from the remote ordering server within local storage of the customer system.

3. The method of claim 2, wherein the step of caching the locally stored ordering information further comprises:

caching item identifications and associated prices within the local storage;

caching the validity period along with an item identification and associated price for each locally stored item having variable ordering information, wherein each validity period indicates a time after which the associated variable data should be updated; and updating item identifications and associated prices upon expiration of a validity period for the item identifications and associated prices by downloading said updated item identifications and associated prices from the remote ordering server.

4. The method of claim 3, wherein the step of updating locally stored variable ordering information further comprises:

determining whether any item identification or associated price relating to the desired transaction has an expired validity period; and updating each item identification or associated price relating to the desired transaction which are determined to have an expired validity period, wherein said order being generated is updated to reflect said current values for said variable ordering information when the current values available from the remote ordering server are different from an initial set of values provided with said order.

5. The method of claim 3, wherein the step of caching item identifications and associated prices within the local storage further comprises:

downloading said item identifications selected by a customer for recurring purchase from a group of available item identifications on the remote ordering server, wherein said item identifications are downloaded along with said associated prices and validity periods.

6. The method of claim 2, wherein:

said obtaining the locally stored ordering information comprises:

connecting with said remote ordering server via the Internet;

selecting specific items and related prices from a group of available items for electronic ordering;

downloading data of said specific items to said customer system; and said caching step includes storing said downloaded data within a specific area of said local storage identified to provide data for completing said order when said order is being generated.

7. A method of supporting efficient transaction of recurring e-commerce sales at a remote ordering server, said method comprising:

responsive to a customer registering for recurring purchases transacted via an e-commerce medium, transmitting to a customer data processing system ordering information, wherein said ordering information includes an electronic order form, item identifications and associated prices along with respective validity periods for items selected by the customer for recurring purchase, wherein the respective validity periods indicates a dated time period after which the associated price of an item should be updated and which triggers the update of associated price whenever an order is submitted to the remote ordering server from the customer data processing system after the dated time period;

responsive to receiving a request for incremental updates of prices for the items selected by the customer for recurring purchase, transmitting current values for prices of the items for which incremental updates were requested; and responsive to receiving an order generated on the customer data processing system utilizing said electronic order form and item identifications and associated prices stored on the customer data processing system:

comparing prices within the order to current values for corresponding prices; and automatically transmitting updated prices to the customer data processing system prior to processing the order, or automatically processing the order with the submitted prices when no updates to prices within the order are required.

8. A system for efficiently effecting recurring e-commerce sales transactions between a customer system and a remote ordering server, comprising:

means for downloading constant data associated with an electronic order form to a fist storage location of said customer system;

means for downloading product data for selected items from a group of available items on said remote ordering server, said selected items being items subject to future recurring purchases, wherein said product data is stored in a second storage location of said customer system and comprises identification data and variable data that is subject to updates on said remote ordering server and to dynamic updates on said customer system from said remote ordering server, said variable data having an associated invalidity period that indicates a time after which the variable data should be updated and which triggers the update of the variable data from said remote ordering server when said time is reached;

means for generating a completed electronic order form for a desired e-commerce transaction by assembling on said customer system said constant data and selected ones of said product data including their respective variable data, wherein said completed electronic order form conforms to ordering requirements of the remote ordering server;

means for submitting said completed electronic order form to said remote ordering system; and means for dynamically updating said variable data within said completed electronic order form to accurately reflect current values of corresponding variable data on the remote ordering server prior to said order being submitted by said server for processing.

9. The system of claim 8, wherein:

the means for generating a completed electronic order form for a desired transaction generates the completed electronic order form on said customer system prior to said customer system being connected to the remote ordering server; and said system further comprises:

means for connecting said customer system to said remote ordering server via the Internet after completion of said electronic order form;

means for downloading and storing updates to said constant data when said constant data has been changed on said remote ordering server;

means for receiving updates of said variable data;

means for caching said updates within said second storage location; and means for reflecting said updates within said completed electronic order form, where appropriate.

10. The system of claim 8, wherein said means for downloading product data further comprises:

means for caching said item identifications and associated prices within the second storage location; and means for caching the associated invalidity period along with each item identification and price, wherein each invalidity period indicates the time after which the associated price must be updated from the remote ordering server.

11. The system of claim 10, wherein the means for updating variable data further comprises:

means for determining whether any item identification or associated price relating to the desired transaction has an expired validity period; and means for updating each item identification or associated price relating to the desired transaction which are determined to have an expired validity period, wherein said electronic order form being generated is updated to reflect said current values for said variable ordering information when the current values available from the remote ordering server are different from an initial set of values provided within said electronic order form.

12. The system of claim 8, wherein the means for updating variable data further comprises:

means for updating only variable data of items selected for inclusion in said completed electronic order form whose validity periods have expired, whereby invalid variable data is updated only when needed.

13. The system of claim 10, wherein:

said means for downloading the data required for completing said electronic order form further comprises:
means for connecting with said remote ordering server via the Internet;
means for selecting specific items and related prices from a group of available items for electronic ordering;

means for downloading an electronic order form and product data of said specific items to said customer system; and
said means for caching includes means for storing said downloaded order form and product data within a specific area of said local storage identified to provide data for completing said completed electronic order form when said order is being generated.

14. The system of claim 8, wherein the means for updating variable data further comprises means for updating all variable data of items stored within said second storage location whose validity periods have expired, whereby all invalid variable data within said second storage location is updated concurrently.

15. The system of claim 8, further comprising means for indicating when variable data of an item is no longer valid.

16. A system for supporting efficient transaction of recurring e-commerce sales, comprising:

means, responsive to a customer registering for recurring purchases transacted via an e-commerce medium, for transmitting to a customer data processing system ordering information, wherein said ordering information includes an electronic order form, item identifications and associated prices along with respective validity periods for items selected by the customer for recurring purchase, wherein the respective validity periods indicates a dated time period after which the associated price of an item should be updated and which triggers the update of associated price whenever an order is submitted to the remote ordering server from the customer data processing system after the dated time period;

means, responsive to receiving a request for incremental updates of prices for the items selected by the customer for recurring purchase, for transmitting current values for prices of the items for which incremental updates were requested; and means, responsive to receiving an order generated on the customer data processing system utilizing said electronic order form and item identifications and associated prices stored on the customer data processing system:
for comparing prices within the order to current values for corresponding prices; and
for automatically transmitting updated prices to the customer data processing system prior to processing the order; or
automatically processing the order with the submitted prices when no updates to prices within the order are required.

17. A computer program product within a computer usable medium for efficiently effecting recurring e-commerce sales transactions between a customer system and a remote ordering server, comprising:

instructions for downloading constant data associated with an electronic order form to a first storage location of said customer system;

instructions for downloading product data for selected items from a group of available items on said remote ordering server, said selected items being items subject to future recurring purchases, wherein said product data is stored in a second storage location of said customer system and comprises identification data and variable data that is subject to updates on said remote ordering server and to dynamic updates on said customer system from said remote ordering server, said variable data having an associated invalidity period that indicates a time after which the variable data should be updated and which triggers the update of the variable data from said remote ordering server when said time is reached;

instructions for generating an a completed electronic order form for a desired e-commerce transaction by assembling on said customer system said constant data and selected ones of said product data including their respective variable data, wherein said completed electronic order form conforms to ordering requirements of a the remote ordering server;

instructions for submitting said completed electronic order form to said remote ordering system; and instructions for updating said variable data within said completed electronic order form to accurately reflect current values of corresponding variable data on the remote ordering server.

18. The computer program product of claim 17, wherein:

the instructions for generating a completed electronic order form for a desired transaction generates the completed electronic order form on said customer system prior to said customer system being connected to the remote ordering server; and said program product further comprises:
instructions for connecting said customer system to said remote ordering server via the Internet after completion of said electronic order form;
instructions for downloading and storing updates to said constant data when said constant data has been changed on said remote ordering server;
instructions for receiving updates of said variable data;
instructions for caching said updates within said second storage location; and instructions for reflecting said updates within said completed electronic order form, where appropriate.

19. The computer program product of claim 17, wherein said instructions for downloading product data further comprises:
   instructions for caching said item identifications and associated prices within the second storage location; and
   instructions for caching an invalidity period along with each item identification and price, wherein each invalidity period indicates the time after which the associated price must be updated from the remote ordering server.

20. The computer program product of claim 19, wherein the instructions for updating variable data further comprises:
   instructions for determining whether any item identification or associated price relating to the desired transaction has an expired validity period; and
   instructions for updating each item identification or associated price relating to the desired transaction which are determined to have an expired validity period, wherein said electronic order form being generated is updated to reflect said current values for said variable ordering information when the current values available from the remote ordering server are different from an initial set of values provided within said electronic order form.

21. The computer program product of claim 17, wherein the instructions for updating variable data further comprises:
   instructions for updating only variable data of items selected for inclusion in said completed electronic order form whose validity periods have expired, whereby invalid variable data is updated only when needed.

22. The computer program product of claim 19, wherein:
   said instructions for downloading the data required for completing said electronic order form further comprises:
      instructions for providing a browser that enables a user to interface with said remote ordering server via the Internet;
      instructions for enabling selection of specific items and related prices from a group of available items on said remote ordering server for electronic ordering;
      instructions for enabling the downloading of an electronic order form and product data of said specific items to said customer system; and
   said instructions for caching includes instructions for storing said downloaded data within a specific area of said local storage identified to provide data for completing said order when said order is being generated.

23. A computer program product within a computer usable medium for supporting efficient transaction of recurring e-commerce sales, said program product comprising:
   instructions, responsive to a customer registering for recurring purchases transacted via an e-commerce medium, for transmitting to a customer data processing system ordering information, wherein said ordering information includes an electronic order form, item identifications and associated prices along with respective validity periods for items selected by the customer for recurring purchase, wherein the respective validity periods indicates a dated time period after which the associated price of an item should be updated and which triggers the update of associated price whenever an order is submitted to the remote ordering server from the customer data processing system after the dated time period;
   instructions, responsive to receiving a request for incremental updates of prices for the items selected by the customer for recurring purchase, for transmitting current values for prices of the items for which incremental updates were requested; and
   instructions, responsive to receiving an order generated on the customer data processing system utilizing said electronic order form and item identifications and associated prices stored on the customer data processing system:
      for comparing prices within the order to current values for corresponding prices; and
      for automatically transmitting updated prices to the customer data processing system prior to processing the order; or
      automatically processing the order with the submitted prices when no updates to prices within the order are required.

24. A method of supporting efficient transaction of recurring e-commerce sales, comprising:
   storing, locally on a customer's system, information from a server relating to an electronic order form and items available for purchase through the server and selected by a customer for recurring electronic ordering, wherein said information includes a validity period that indicates when a variable data related to an item expires and should be updated from the server;
   periodically updating at least individual items of information stored locally on the customer's system, wherein said individual items of information includes the variable data and the periodic updates are triggered by an expiration of the associated validity period, which messages the server to provide an update for said variable data;
   generating an order for purchase utilizing the information stored locally on the customer's system including said individual items of information that is periodically updated; and
   submitting the order to the server to purchase selected items.

25. A method for efficiently effecting recurring e-commerce sales transactions between a customer system and a remote ordering server, comprising:
   downloading constant data associated with an electronic order form to a first storage location of said customer system;
   downloading product data for selected items from a group of available items on said remote ordering server, said selected items being items subject to future recurring purchases, wherein said product data is stored in a second storage location of said customer system and comprises identification data and variable data that is subject to updates on said remote ordering server and to dynamic updates on said customer system from said remote ordering server, said variable data having an associated tag that indicates a time after which the variable data should be updated and which triggers the update of the variable data from said server when said time is reached;
   generating a completed electronic order form for a desired e-commerce transaction by assembling on said customer system said constant data and selected ones of said product data including their respective variable data, wherein said completed electronic order form conforms to ordering requirements of the remote ordering server;

submitting said completed electronic order form to said remote ordering system; and when said tag indicates that the associated variable data should be updated, automatically updating said variable data in the completed electronic order form to accurately reflect current values of corresponding variable data on the remote ordering server.

26. The method of claim 25, wherein:

the step of generating a completed electronic order form for a desired transaction generates the completed electronic order form on said customer system prior to said customer system being connected to the remote ordering server; and said method further comprises:
- connecting said customer system to said remote ordering server via the Internet after completion of said electronic order form;
- downloading and storing updates to said constant data when said constant data has been changed on said remote ordering server;
- receiving updates of said variable data;
- caching said updates within said second storage location; and
- reflecting said updates within said completed electronic order form, where appropriate.

27. The method of claim 25, wherein said step of downloading product data farther comprises:

caching said item identifications and associated prices within the second storage location;

caching an invalidity period along with each item identification and price, wherein each invalidity period indicates the time after which the associated price must be updated from the remote ordering server.

28. The method of claim 27, wherein the step of updating variable data further comprises:

determining whether any item identification or associated price relating to the desired transaction has an expired validity period; and updating each item identification or associated price relating to the desired transaction which are determined to have an expired validity period, wherein said electronic order form being generated is updated to reflect said current values for said variable ordering information when the current values available from the remote ordering server are different from an initial set of values provided within said electronic order form.

29. The method of claim 25, wherein the step of updating variable data further comprises:

updating only variable data of items selected for inclusion in said completed electronic order form whose validity periods have expired, whereby invalid variable data is updated only when needed.

30. The method of claim 25, wherein the step of updating variable data further comprises updating all variable data of items stored within said second storage location whose validity periods have expired, whereby all invalid variable data within said second storage location is updated concurrently.

31. The method of claim 25, further comprising indicating when variable data of an item is no longer valid.

* * * * *